Dec. 4, 1951  C. W. MOTT  2,577,351
REMOTE MOTOR CONTROL
Filed April 20, 1946  2 SHEETS—SHEET 1
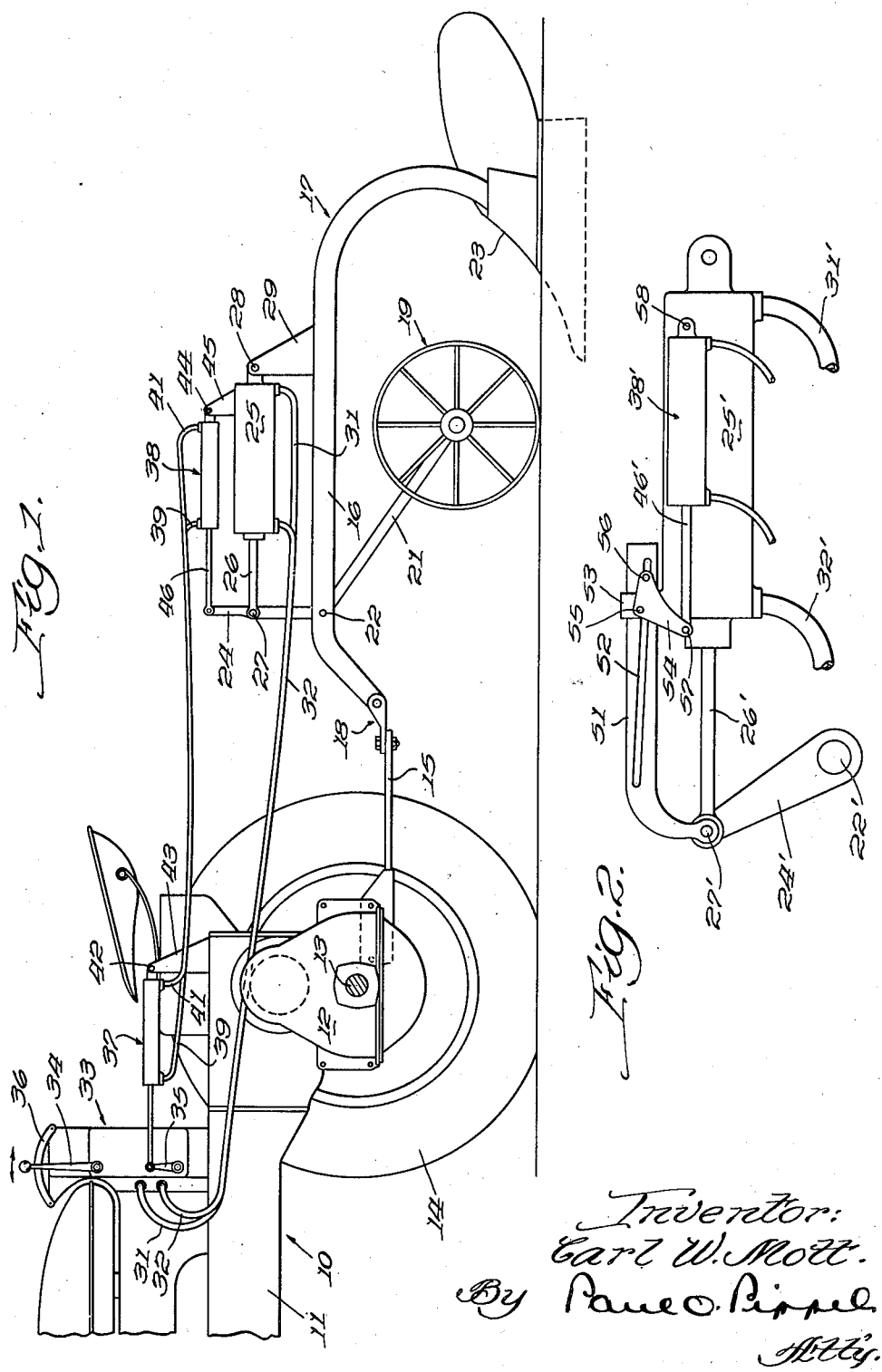
Inventor:
Carl W. Mott.
By Paul O. Rippel
Atty.

Dec. 4, 1951  C. W. MOTT  2,577,351
REMOTE MOTOR CONTROL
Filed April 20, 1946  2 SHEETS—SHEET 2
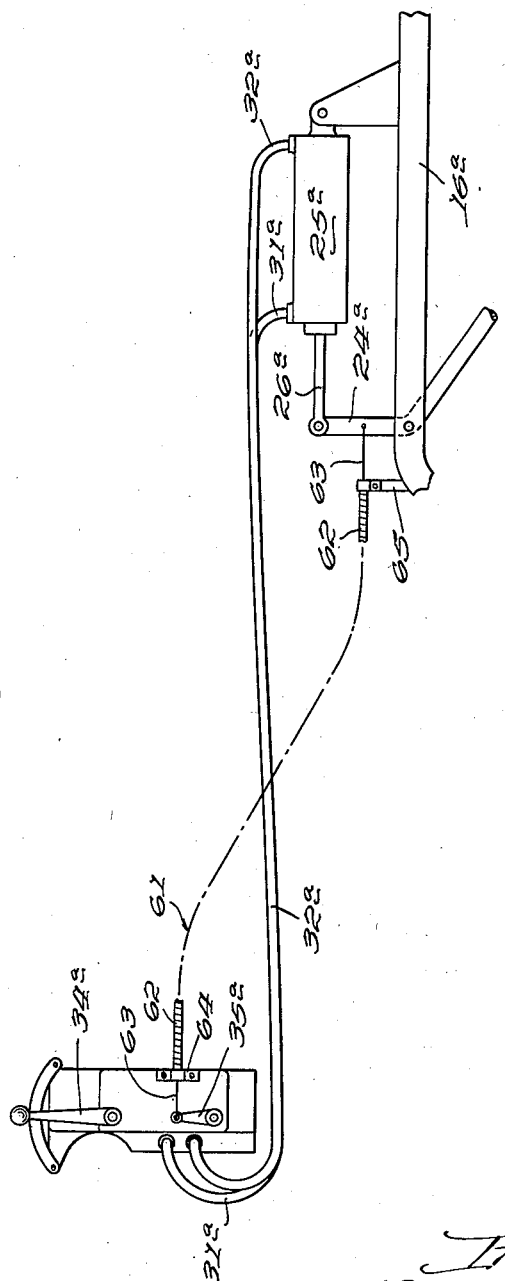
Inventor:
Carl W. Mott.
By Paul O. Pippel
Atty.

Patented Dec. 4, 1951

2,577,351

UNITED STATES PATENT OFFICE 2,577,351

REMOTE MOTOR CONTROL

Carl W. Mott, La Grange, Ill., assignor to International Harvester Company, a corporation of New Jersey Application April 20, 1946, Serial No. 663,711

1 Claim. (Cl. 97—50)

This invention concerns hydraulic control systems generally of the telemotor type, while more particularly relating to improvements employing flexible power transmitting elements between a master control apparatus on a traction vehicle and the work member of a hydraulic motor mounted on an articulately-connected implement or vehicle to correlate movement of such work member with that of a control member of the apparatus.

My copending application Serial No. 516,471, filed December 31, 1943, and issued as Patent No. 2,399,756 for Fluid Control for Fluid-Driven Motor, discloses a tractor having a fluid delivery pump and a hydraulic control apparatus for controlling the delivery of actuating fluid from the pump to a hydraulic motor in close association therewith on the tractor. Said control apparatus has a manually operated control member movable in either of opposite directions to initiate delivery of fluid from the pump to the motor in a manner causing corresponding movement of the motor work member. Such apparatus also has a mechanically operated control or fluid passage shut-off member connected with the work member and to be driven thereby for terminating delivery of actuating fluid to the motor when the work member has been driven a distance corresponding to the distance the manual member had been set. The general object of this invention is the provision of a novel arrangement by means of which telemotor-like supervision of said tractor-mounted control apparatus can be had over a fluid-actuated motor mounted on an implement or vehicle articulately connected with the tractor for adjusting a part of such implement or vehicle a distance and amount corresponding to the distance and amount of adjustment of the manually operated control member.

A more specific object and contemplation of the invention is the utilization of flexible sheath-enclosed means as the fluid columns of a hydraulic ram couple or a Bowden wire for transmitting the mechanically incurred motion from the motor work member to the shut-off control member.

A further object is the provision of movement magnitude modulating means between the motor work member and the sheath-enclosed means as an expedient for regulating the amount of movement of the shut-off control member per unit of movement of the work member, although it is contemplated that a similar type of regulation is possible by choosing relative diameters of hydraulic ram plunger chambers in the ram couple.

The above and other desirable objects and capabilities of the invention will be better understood from the ensuing description with reference to the annexed drawings, wherein:

Fig. 1 is a side elevational view of the rear portion of a tractor having a trail-behind vehicle or implement articulately connected therewith and having thereon a hydraulically actuated motor controlled remotely by a manually controlled mechanism upon the tractor.

Fig. 2 is a side elevational view of a modified form of connection between the work member of the implement-mounted motor and a hydraulic ram couple device employed for setting the manually controlled apparatus on the tractor into the neutral position for stopping the motor when said work member has moved a distance and direction correlated with the distance and direction of the manual control member of the tractor-mounted control apparatus.

Fig. 3 is a fragmentary view taken similarly to Fig. 1 and illustrating a Bowden wire arrangement employed in lieu of the ram couple for transmitting control movement from the hydraulic motor to the valve shut-off lever on the control apparatus mounted on the tractor.

Referring now particularly to Fig. 1, a tractor 10 of which a rear portion is shown has a body frame 11 projecting forwardly from a depending axle housing structure 12 which supports axles 13 by means of which traction wheels 14 (one being shown) are driven. A draw-bar 15 extends rearwardly from the tractor for connection with a beam 16 of a trail-behind implement 17 through an articulate connection 18. The implement comprises a gauge wheel 19 journaled on the lower end of an arm 21 pivoted at 22 to the beam 16. By changing the elevation of the wheel 19 with respect to the beam 16 the depth or elevation of a plow bottom 23 can be varied. When the arm 21 is pivoted clockwise the beam and plow bottom will be raised whereas pivotal adjustment of the arm 21 in the opposite direction will cause the plow bottom to be lowered.

Pivotal adjustment of the gauge wheel arm is controlled by a second arm 24 with which the arm 21 is constrained for rotation about the pivot 22. A hydraulically actuated motor 25 has the outer end of its piston rod or work member 26 pivotally connected with the arm 24 at 27, while the cylinder of such motor is pivotally connnected at 28 to a bracket 29 which is mounted upon the implement beam. A piston within the cylinder and with which the piston rod 26 is constrained for movement is adapted to be selectively moved endwise within the cylinder by the selective introduction of fluid into the ends of the cylinder by means of hoses 31 and 32 incident to the exhaust of fluid through the other of such hoses.

The tractor carries a hydraulic control apparatus 33 for controlling the selective flow of fluid into and from the hoses 31 and 32. This apparatus 33, which is described in detail in the above mentioned Patent No. 2,399,756, controls the circulation of fluid from a tractor driven pump, not shown, selectively through the conduits 31 and 32 and the return of the fluid from the other of such conduits 31 and 32 to a reservoir, not shown. A manual lever 34 of the apparatus is manipulated to select one of the conduits 31 or 32 which receive fluid under pressure from said pump and to initiate such flow of fluid. Mechanically operated lever 35 is pivotable for terminating the flow of fluid initiated by manipulation of the lever 34. For example, in the operation of the apparatus, movement of the manually controlled lever 34 rearwardly or to the right along its associated quadrant 36 will cause fluid under pressure to be introduced into the hose 31 and therefore into the rear end of the motor 25 for forcing the piston rod 26 forwardly incident to exhaust fluid from the motor through the hose 32 and through the apparatus 33 to said reservoir. A hydraulic ram couple comprising a tractor-mounted ram unit 37 and an implement-mounted ram unit 38 and interconnecting hoses 39 and 41 is employed for moving the shut-off lever 35 into position for terminating the flow of fluid through the conduits 31 and 32 when the piston rod or work member 26 of the motor has moved a distance correlated with the distance the manual lever 34 was moved pursuant to initiating work member movement. The ram unit 37 has the rear end of its cylinder pivotally connected at 42 to a bracket 43 secured to the tractor frame, while the rear end of the cylinder of the ram unit 38 is likewise pivotally connected at 44 to a bracket 45 mounted upon the cylinder of the hydraulic motor 25.

Manual adjustment of the control apparatus lever 34 in either direction along its quadrant 36 will initiate the flow of fluid in the conduits 31 and 32, and this flow will continue until movement of the shut-off lever 35 in the same direction is sufficiently far to shut off the flow in the passages with which the conduits 31 and 32 are connected within the casing of the apparatus 33. Movement of the lever 34 clockwise will cause the introduction of fluid into the conduit 31 whereby the motor 25 is actuated for moving its work member 26 forwardly and to actuate the hydraulic ram couple for pivoting the shut-off lever 35 clockwise, as explained above. In the actuation of the ram couple, the fluid within the circuit thereof moves as columns lengthwise of and within the hoses 39 and 41 which serve as flexible sheaths for these fluid columns. Movement of the manual control lever counter-clockwise along its quadrant 36 will cause the introduction of fluid under pressure into the conduit 32 to actuate the motor 25 for forcing the lever 24 rearwardly incident to operating the plunger in the ram unit 38 for ejecting fluid into the hose 41 and thereby forcing the plunger of the ram unit 37 forwardly to move the shut-off lever counter-clockwise. Actuation of the motor 25 will continue until the lever 35 has moved counter-clockwise sufficiently far to terminate introduction of fluid into the conduit 32. In the present installation since the rod 46 or the plunger in the ram unit 38 is connected with the lever 24 at a greater distance from the pivot 22 of such lever than the point of connection of the rod 26 with such lever, there is an amplification of the motion imparted to the piston rod 26 for application to the rod 46. In other words, there is a modulation of the magnitude of movement of the rod 26 supplied to the rod 46. When the hydraulic ram cylinders have the same internal diameter, this amplification in the magnitude of movement of the piston rod 26 will be imparted to the end of the shut-off lever 35, resulting in more sudden and positive closing of the valves which control the flow of fluid into and from the conduits 31 and 32. The same effect may be obtained without amplification of the motion imparted to the rod 46 if the cylinder of the unit 38 is made of larger bore than the cylinder of the unit 37.

Fig. 2 illustrates a modification in which a modified motion magnitude modifying means in the form of a cam and cam follower is employed for transmitting force from a rod 26' (corresponding to the work member 26 in Fig. 1) to the plunger rod 46' of a ram unit 38' corresponding to the ram 38. Each of the parts in Fig. 2 designated by a reference character with a prime corresponds to respective parts correspondingly designated without the prime in Fig. 1. This motion transmitting means comprises a cam member 51 pivotally connected at 27' to the work member 26' and having a cam slot 52 extending diagonally of the motor axis. As the cam 51 moves with the work member 26', such cam slides within a guide 53 on the motor casing. A small bell crank lever 54 is pivoted to the guide 53 by a pin 55 and has a cam follower pin 56 projecting into the slot 52 so that the lever will be pivoted about the pin 55 pursuant to endwise movement of the cam. A pivot pin 57 establishes a connection between the lower leg of the bell crank and the plunger rod 46'. The rear end of the cylinder of the unit 38' has a pivotal anchorage 58 mounted on the motor cylinder.

The operation of the apparatus shown in Figure 2 is the same in principle as that explained with reference to Fig. 1, the difference being that the cam and cam follower 51–56 in combination with the bell crank 54 transmit a diminished motion from the work member 26' to the plunger rod 46' of the hydraulic ram unit 38' so that said ram unit and its companion corresponding to the unit 37 can be of miniature dimensions.

In the modified arrangement shown in Fig. 3, a Bowden wire device 61 comprising a sheath 62 and a flexible wire 63 slidable axially within the sheath is substituted for the hydraulic ram couple devices shown in Figs. 1 and 2. Excepting for the Bowden wire and brackets 64 and 65 associated with the sheath thereof, the parts illustrated in Fig. 3 correspond respectively to parts illustrated in Fig. 1 and are designated by the same respective reference characters with the addition of a small "a." Bracket 64 fixes the forward end of the sheath 62 to the casing of the control device 33, whereas the bracket 65 rigidly secures the rear end of the sheath to the implement frame 16ª. In the operation of the apparatus of Fig. 3, counter-clockwise rotation of the control lever 34ª will cause the introduction of fluid into the hose 31ª for delivery to the front end of the motor cylinder, causing rearward movement of the piston rod 26ª and consequent rearward sliding of the wire 63 in the sheath 62 whereby the mechanically controlled arm 35ª of the control device is also moved clockwise for terminating the flow of fluid to the motor when the piston rod 26ª has moved a distance predeterminedly correlated with the distance of movement of the control arm 34ª.

Counter-clockwise adjustment of the control arm 34ª will cause the introduction of fluid into the conduit 32ª and movement of the motor piston rod 26ª in the opposite direction wherefore the Bowden wire device causes counter-clockwise movement of the arm 35ª for shutting off the delivery of fluid to the motor when the piston rod has moved a distance corresponding to the distance of movement of the control arm 34ª. A more sensitive control for the shut-off lever 35ª can be provided by connecting the back end of the sheathed wire 63 with an upper extension of the arm 24ª similarly to the connection of the ram plunger 46 in the Fig. 1 embodiment whereby there is an amplification of the motion imparted to the valve shut-off lever 35ª from the motor piston rod 26ª.

Having thus described a limited number of embodiments of the invention with the view of clearly and concisely illustrating the same, I claim:

In an appartus for use in conjunction with a tractor, an articulately connected implement including an adjustable part, and a tractor-mounted power control mechanism adapted to transmit power in directions determined by the direction of adjustment of a control member and to interrupt the transmission of such power at a time determined by adjustment of a shut-off member in correlation with the direction and amount of control member adjustment; a motor mountable on said implement and including a work member connectable with said implement part for moving the same therewith, said motor being selectively energizable by power from said power control mechanism to cause movement of said work member and said part in either of opposite directions according to the direction of adjustment of said control member, flexible means for transmitting such power from said mechanism to said motor, and a hydraulic ram couple having ram units connected by flexible hoses and respectively mountable on said tractor and said implement for connection between said work member and said shut-off member to adjust the latter in the direction for interrupting the transmission of energizing power to said motor when the work member and said implement part have moved a distance correlated with the adjustment of said control member.

CARL W. MOTT.

REFERENCES CITED

The following references are of record in the file of this patent:

UNITED STATES PATENTS

| Number | Name | Date |
|---|---|---|
| 2,062,089 | Eaton | Nov. 24, 1936 |
| 2,226,821 | Kempson | Dec. 31, 1940 |
| 2,341,151 | Maloon | Feb. 8, 1944 |
| 2,399,756 | Mott | May 7, 1946 |
| 2,401,680 | Eaton | June 4, 1946 |
| 2,410,918 | Acton | Nov. 12, 1946 |